United States Patent
Minor

(10) Patent No.: US 12,139,658 B2
(45) Date of Patent: Nov. 12, 2024

(54) HEAT TRANSFER COMPOSITIONS COMPRISING R-1225ye(E) AND R-32

(71) Applicant: THE CHEMOURS COMPANY FC, LLC, Wilmington, DE (US)

(72) Inventor: Barbara Haviland Minor, The Villages, FL (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 475 days.

(21) Appl. No.: 17/433,055

(22) PCT Filed: Mar. 3, 2020

(86) PCT No.: PCT/US2020/020729
§ 371 (c)(1),
(2) Date: Aug. 23, 2021

(87) PCT Pub. No.: WO2020/180834
PCT Pub. Date: Sep. 10, 2020

(65) Prior Publication Data
US 2022/0041911 A1    Feb. 10, 2022

Related U.S. Application Data

(60) Provisional application No. 62/813,258, filed on Mar. 4, 2019.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/106* (2013.01); *C09K 2205/126* (2013.01); *C09K 2205/22* (2013.01); *C09K 2205/40* (2013.01)

(58) Field of Classification Search
CPC .......... C09K 2205/126; C09K 2205/22; C09K 2205/40; C09K 2205/106; F25B 9/006
See application file for complete search history.

(56) References Cited

U.S. PATENT DOCUMENTS

| | | | |
|---|---|---|---|
| 2006/0243945 A1* | 11/2006 | Minor | C08J 9/149 252/67 |
| 2007/0284555 A1 | 12/2007 | Leck et al. | |
| 2010/0044620 A1 | 2/2010 | Rached | |
| 2010/0186432 A1* | 7/2010 | Perti | C09K 5/045 252/68 |
| 2013/0234062 A1* | 9/2013 | Tsuchiya | C10M 171/008 252/68 |
| 2018/0016212 A1* | 1/2018 | Singh | C07C 21/18 |

FOREIGN PATENT DOCUMENTS

| | | | | |
|---|---|---|---|---|
| GB | 2435747 A | * | 9/2007 | ............... C09K 3/30 |
| JP | 2015214632 A | | 12/2015 | |
| WO | 9602607 A1 | | 2/1996 | |
| WO | 2006094303 A2 | | 9/2006 | |
| WO | 2007126414 A2 | | 11/2007 | |
| WO | 2008009928 A2 | | 1/2008 | |
| WO | WO-2008065011 A1 | * | 6/2008 | ............. C07C 19/08 |
| WO | 2009018117 A1 | | 2/2009 | |

OTHER PUBLICATIONS

PCT International Search Report and Written Opinion for International Application No. PCT/US2020/020729 mailed Jun. 18, 2020.
Scientific Assessment of Ozone Depletion: 2002, A Report of the World Meteorological Association's Global Ozone Research and Monitoring Project, 2002, pp. 1.28-1.31, Section 1.4.4, World Meteorological Organization, Geneva, Switzerland.

* cited by examiner

*Primary Examiner* — Lionel Nouketcha

(57) ABSTRACT

The present application relates to compositions comprising (E)-1,2,3,3,3-pentafluoro-1-propene (i.e., R-1225ye(E) or HFO-1225ye(E)), R-32, and, optionally, one or more additional components, that are useful in refrigeration, air conditioning, or heat pump systems. Methods of replacing R-134a or R-513A in refrigeration, air conditioning, or heat pump systems are also provided.

9 Claims, No Drawings

HEAT TRANSFER COMPOSITIONS COMPRISING R-1225ye(E) AND R-32

TECHNICAL FIELD

The present application relates to compositions comprising (E)-1,2,3,3,3-pentafluoro-1-propene (i.e., R-1225ye(E) or HFO-1225ye(E)), R-32, and, optionally, one or more additional components, for use in refrigeration, air conditioning or heat pump systems. The compositions of the present invention are useful in methods for producing cooling and heating, and methods for replacing refrigerants and refrigeration, air conditioning and heat pump apparatus.

BACKGROUND

Many current commercial refrigerants employ hydrochlorofluorocarbons ("HCFCs") or hydrofluorocarbons ("HFCs"). HCFCs contribute to ozone depletion and are scheduled for eventual phaseout under the Montreal Protocol. HFCs, while not contributing to ozone depletion, can contribute to global warming and the use of such compounds has come under scrutiny by environmental regulators. Thus, there is a need for refrigerants that are characterized by a no ozone depletion potential (ODP) and low impact on global warming. This application addresses this need and others.

SUMMARY

The present application provides, inter alia, compositions comprising (E)-1,2,3,3,3-pentafluoro-1-propene and R-32.

The present application further provides processes for producing cooling, comprising condensing a composition provided herein and thereafter evaporating said composition in the vicinity of a body to be cooled.

The present application further provides processes for producing heating, comprising evaporating a composition provided herein and thereafter condensing said composition in the vicinity of a body to be heated.

The present application further provides methods of replacing R-134a or R-513A in a refrigeration, air conditioning, or heat pump system, comprising providing a composition provided herein as replacement for said R-134a or R-513A.

The present application further provides air conditioning systems, heat pump systems, and refrigeration systems comprising a composition provided herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DETAILED DESCRIPTION

The present disclosure provides compositions (e.g., heat transfer composition and/or refrigerant compositions) comprising (E)-1,2,3,3,3-pentafluoro-1-propene (i.e., R-1225ye(E) or HFO-1225ye(E)), R-32, and optionally, a compound selected from HFO-1234yf, R-125, $CO_2$, or any mixture thereof. The compositions provided herein may be useful, for example, in refrigerant and/or heat transfer applications formerly served by incumbent refrigerant compounds (e.g., CFCs, HFCs, and the like).

Definitions and Abbreviations

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, the term "consisting essentially of" is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term "consists essentially of" or "consisting essentially of" occupies a middle ground between "comprising" and "consisting of".

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the term "about" is meant to account for variations due to experimental error (e.g., plus or minus approximately 10% of the indicated value). All measurements reported herein are understood to be modified by the term "about", whether or not the term is explicitly used, unless explicitly stated otherwise.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced.

As used herein the term "Ozone depletion potential" (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant or working fluid in an evaporator per unit mass of refrigerant or working fluid circulated. Volumetric cooling capacity refers to the amount of heat removed by the refrigerant or working fluid in the evaporator per unit volume of refrigerant vapor exiting the evaporator. The refrigeration capacity is a measure of the ability of a refrigerant, working fluid or heat transfer composition to produce cooling. Therefore, the higher the volumetric cooling capacity of the working fluid, the greater the cooling rate that can be produced at the evaporator with the maximum volumetric flow rate achievable with a given compressor. Cooling rate refers to the heat removed by the refrigerant in the evaporator per unit time.

Similarly, volumetric heating capacity is a term to define the amount of heat supplied by the refrigerant or working fluid in the condenser per unit volume of refrigerant or working fluid vapor entering the compressor. The higher the volumetric heating capacity of the refrigerant or working fluid, the greater the heating rate that is produced at the condenser with the maximum volumetric flow rate achievable with a given compressor.

Coefficient of performance (COP) is the amount of heat removed in the evaporator divided by the energy required to operate the compressor. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer medium comprises a composition used to carry heat from a heat source to a heat sink. For example, heat from a body to be cooled to a chiller evaporator or from a chiller condenser to a cooling tower or other configuration where heat can be rejected to the ambient.

As used herein, a working fluid or refrigerant comprises a compound or mixture of compounds (e.g., a composition provided herein) that function to transfer heat in a cycle wherein the working fluid undergoes a phase change from a liquid to a gas and back to a liquid in a repeating cycle.

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. By cooling a liquid below the saturation temperature, the net refrigeration capacity can be increased. Subcooling thereby improves refrigeration capacity and energy efficiency of a system. Subcool amount is the amount of cooling below the saturation temperature (in degrees) or how far below its saturation temperature a liquid composition is cooled.

The term "superheat" defines how far above the saturation vapor temperature of a vapor composition a vapor composition is heated. Saturation vapor temperature is the temperature at which, if a vapor composition is cooled, the first drop of liquid is formed, also referred to as the "dew point".

Chemicals, Abbreviations, and Acronyms

HFC: hydrofluorocarbon
HCFC: hydrochlorofluorocarbon
HFO: hydrofluoroolefin
R-32: difluoromethane
R-125: 1,1,1,2,2-pentafluoroethane
R-134a, HFC-134a, or 134a: 1,1,1,2-tetrafluoroethane
R-1225ye(E), HFO-1225yeE or 1225yeE: (E)-1,2,3,3,3-pentafluoro-1-propene
R-1234yf, HFO-1234yf, or 1234yf: 2,3,3,3-tetrafluoropropene
CAP: cooling (or heating) capacity
COP: coefficient of performance
GWP: global warming potential
ODP: ozone depletion potential
R-513A: Mixture of 56 weight percent 2,3,3,3-tetrafluoropropene (R-1234yf) and 44 weight percent 1,1,1,2-tetrafluoroethane (R-134a)

Compositions

The present application provides a composition comprising (E)-1,2,3,3,3-pentafluoro-1-propene and R-32. In some embodiments, the composition consists essentially of (E)-1,2,3,3,3-pentafluoro-1-propene and R-32. In some embodiments, the composition consists of (E)-1,2,3,3,3-pentafluoro-1-propene and R-32.

In some embodiments, the composition comprises about 85 to about 95 weight percent (E)-1,2,3,3,3-pentafluoro-1-propene, for example, about 85, about 90, or about 95 weight percent (E)-1,2,3,3,3-pentafluoro-1-propene. In some embodiments, the composition comprises about 90 weight percent (E)-1,2,3,3,3-pentafluoro-1-propene.

In some embodiments, the composition comprises about 5 to about 15 weight percent R-32, for example, about 5, about 10, or about 15 weight percent R-32. In some embodiments, the composition comprises about 10 weight percent R-32.

In some embodiments, the composition comprises about 90 weight percent (E)-1,2,3,3,3-pentafluoro-1-propene and about 10 weight percent R-32.

In some embodiments, the compositions provided herein further comprise a compound selected from HFO-1234yf, R-125, and $CO_2$, or any mixture thereof.

In some embodiments, the composition comprises about 40 to about 95 weight percent (E)-1,2,3,3,3-pentafluoro-1-propene, for example, about 40 to about 90, about 40 to about 80, about 40 to about 70, about 40 to about 60, about 40 to about 50, about 50 to about 95, about 50 to about 90, about 50 to about 80, about 50 to about 70, about 50 to about 60, about 60 to about 95, about 60 to about 90, about 60 to about 80, about 60 to about 70, about 70 to about 95, about 70 to about 90, about 70 to about 80, about 80 to about 95, about 80 to about 90, or about 90 to about 95 weight percent (E)-1,2,3,3,3-pentafluoro-1-propene.

In some embodiments, the composition comprises about 2 to about 12 weight percent R-32, for example, about 2 to about 10, about 2 to about 8, about 2 to about 6, about 2 to about 4, about 4 to about 12, about 4 to about 10, about 4 to about 8, about 4 to about 6, about 6 to about 12, about 6 to about 10, about 6 to about 8, about 8 to about 12, about 8 to about 10, or about 10 to about 12 weight percent R-32.

In some embodiments, the composition comprises about 41 to about 48 weight percent HFO-1234yf, for example, about 41 to 46, about 41 to 44, about 41 to 42, about 42 to 48, about 42 to 46, about 42 to 44, about 44 to 48, about 44 to 46, or about 44 to 48 weight percent HFO-1234yf.

In some embodiments, the composition comprises about 1 to about 6 weight percent R-125, for example, about 1 to about 4, about 1 to about 2, about 2 to about 6, about 2 to about 4, or about 4 to about 6.

In some embodiments, the composition comprises about 1 to about 3 weight percent $CO_2$, for example, about 1, about 2, or about 3 weight percent $CO_2$.

In some embodiments, the composition comprises (E)-1,2,3,3,3-pentafluoro-1-propene, R-32, HFO-1234yf, and R-125.

In some embodiments, the composition comprises about 41 to about 49 weight percent (E)-1,2,3,3,3-pentafluoro-1-propene. In some embodiments, the composition comprises about 44 to about 47 weight percent (E)-1,2,3,3,3-pentafluoro-1-propene. In some embodiments, the composition comprises about 46 to about 47 weight percent (E)-1,2,3,3,3-pentafluoro-1-propene.

In some embodiments, the composition comprises about 2 to about 12 weight percent R-32. In some embodiments, the composition comprises about 4 to about 8 weight percent R-32. In some embodiments, the composition comprises about 4 to about 6 weight percent R-32.

In some embodiments, the composition comprises about 41 to about 48 weight percent HFO-1234yf. In some embodiments, the composition comprises about 44 to about 47 weight percent HFO-1234yf. In some embodiments, the composition comprises about 45 to about 47 weight percent HFO-1234yf.

In some embodiments, the composition comprises about 1 to about 6 weight percent R-125. In some embodiments, the composition comprises about 2 to about 4 weight percent R-125. In some embodiments, the composition comprises about 2 to about 3 weight percent R-125.

In some embodiments, the composition comprises about 41 to about 49 weight percent (E)-1,2,3,3,3-pentafluoro-1-propene, about 2 to about 12 weight percent R-32, about 41 to about 48 weight percent HFO-1234yf, and about 1 to about 6 weight percent R-125.

In some embodiments, the composition comprises about 44 to about 47 weight percent (E)-1,2,3,3,3-pentafluoro-1-propene, about 4 to about 8 weight percent R-32, about 44 to about 47 weight percent HFO-1234yf, and about 2 to about 4 weight percent R-125.

In some embodiments, the composition comprises about 46 to about 47 weight percent (E)-1,2,3,3,3-pentafluoro-1-propene, about 4 to about 6 weight percent R-32, about 45 to about 47 weight percent HFO-1234yf, and about 2 to about 3 weight percent R-125.

In some embodiments, the composition comprises (E)-1,2,3,3,3-pentafluoro-1-propene, R-32, HFO-1234yf, and $CO_2$.

In some embodiments, the composition comprises about 46 to about 49 weight percent (E)-1,2,3,3,3-pentafluoro-1-propene. In some embodiments, the composition comprises about 47 to about 49 weight percent (E)-1,2,3,3,3-pentafluoro-1-propene.

In some embodiments, the composition comprises about 2 to about 6 weight percent R-32. In some embodiments, the composition comprises about 2 to about 4 weight percent R-32, In some embodiments, the composition comprises about 45 to about 48 weight percent HFO-1234yf. In some embodiments, the composition comprises about 47 to about 48 weight percent HFO-1234yf, In some embodiments, the composition comprises about 1 to about 3 weight percent $CO_2$. In some embodiments, the composition comprises about 1 to about 2 weight percent $CO_2$.

In some embodiments, the composition comprises about 46 to about 49 weight percent (E)-1,2,3,3,3-pentafluoro-1-propene, about 2 to about 6 weight percent R-32, about 45 to about 48 weight percent HFO-1234yf, and about 1 to about 3 weight percent $CO_2$.

In some embodiments, the composition comprises about 47 to about 49 weight percent (E)-1,2,3,3,3-pentafluoro-1-propene, about 2 to about 4 weight percent R-32, about 47 to about 48 weight percent HFO-1234yf, and about 1 to about 2 weight percent $CO_2$.

In some embodiments, the composition comprises (E)-1,2,3,3,3-pentafluoro-1-propene, R-32, HFO-1234yf, R-125, and $CO_2$.

In some embodiments, the composition comprises about 43 to about 47 weight percent (E)-1,2,3,3,3-pentafluoro-1-propene. In some embodiments, the composition comprises about 44 to about 47 weight percent (E)-1,2,3,3,3-pentafluoro-1-propene. In some embodiments, the composition comprises about 44 to about 47 weight percent (E)-1,2,3,3,3-pentafluoro-1-propene. In some embodiments, the composition comprises about 46 to about 47 weight percent (E)-1,2,3,3,3-pentafluoro-1-propene.

In some embodiments, the composition comprises about 4 to about 10 weight percent R-32. In some embodiments, the composition comprises about 4 to about 8 weight percent R-32. In some embodiments, the composition comprises about 4 to about 8 weight percent R-32. In some embodiments, the composition comprises about 4 to about 6 weight percent R-32.

In some embodiments, the composition comprises about 42 to about 47 weight percent HFO-1234yf. In some embodiments, the composition comprises about 44 to about 47 weight percent HFO-1234yf. In some embodiments, the composition comprises about 44 to about 47 weight percent HFO-1234yf. In some embodiments, the composition comprises about 45 to about 47 weight percent HFO-1234yf.

In some embodiments, the composition comprises about 1 to about 4 weight percent R-125. In some embodiments, the composition comprises about 1 to about 2 weight percent R-125. In some embodiments, the composition comprises about 1 to about 2 weight percent R-125. In some embodiments, the composition comprises about 1 to about 2 weight percent R-125.

In some embodiments, the composition comprises about 1 to about 2 weight percent $CO_2$. In some embodiments, the composition comprises about 1 to about 2 weight percent $CO_2$. In some embodiments, the composition comprises about 1 to about 2 weight percent $CO_2$. In some embodiments, the composition comprises about 1 to about 1 weight percent $CO_2$.

In some embodiments, the composition comprises about 43 to about 47 weight percent (E)-1,2,3,3,3-pentafluoro-1-propene, about 4 to about 10 weight percent R-32, about 42 to about 47 weight percent HFO-1234yf, about 1 to about 4 weight percent R-125, and about 1 to about 2 weight percent $CO_2$.

In some embodiments, the composition comprises about 44 to about 47 weight percent (E)-1,2,3,3,3-pentafluoro-1-propene, about 4 to about 8 weight percent R-32, about 44 to about 47 weight percent HFO-1234yf, about 1 to about 2 weight percent R-125, and about 1 to about 2 weight percent $CO_2$.

In some embodiments, the composition comprises about 46 to about 47 weight percent (E)-1,2,3,3,3-pentafluoro-1-propene, about 4 to about 6 weight percent R-32, about 45 to about 47 weight percent HFO-1234yf, about 1 to about 2 weight percent R-125, and about 1 to about 1 weight percent $CO_2$.

In some embodiments, the composition provided herein is selected from the group of compositions provided in Tables 1A-1B.

In some embodiments, the composition is a composition selected from the group of compositions provided in Tables 1A-1B, wherein the compositions exhibits a cooling capacity (CAP) that is within about ±3% to about ±20% of the cooling capacity of R-134a or R-513A.

In some embodiments, the composition is a composition selected from the group of compositions provided in Tables 1A-1B, wherein the compositions exhibit a cooling capacity (CAP) that is within about ±20% of the cooling capacity of R-134a or R-513A. In some embodiments, the composition is a composition selected from the group of compositions provided in Tables 1A-1B, wherein the compositions exhibit a cooling capacity (CAP) that is within about ±15% of the cooling capacity of R-134a or R-513A. In some embodiments, the composition is a composition selected from the group of compositions provided in Tables 1A-1B, wherein the compositions exhibit a cooling capacity (CAP) that is within about ±10% of the cooling capacity of the R-134a or R-513A. In some embodiments, the composition is a composition selected from the group of compositions provided in Tables 1A-1B, wherein the compositions exhibit a cooling capacity (CAP) that is within about ±5% of the cooling capacity of the R-134a or R-513A. In some embodiments, the composition is a composition selected from the group of compositions provided in Tables 1A-1B, wherein the compositions exhibit a GWP less than about 750. In some embodiments, the composition is a composition selected from the group of compositions provided in Tables 1A-1B, wherein the compositions exhibit a GWP less than about 400. In some embodiments, the composition is a composition selected from the group of compositions provided in Tables 1A-1B, wherein the compositions exhibit a GWP less than about 250. In some embodiments, the composition is a composition selected from the group of compositions provided in Tables 1A-1B, wherein the compositions exhibit a GWP less than about 150.

In some embodiments, the composition provided herein is selected from the group of compositions provided in Tables 2A-2B.

In some embodiments, the composition is a composition selected from the group of compositions provided in Tables 2A-2B, wherein the compositions exhibit a cooling capacity (CAP) that is within about ±3% to about ±20% of the cooling capacity of R-134a or R-513A.

In some embodiments, the composition is a composition selected from the group of compositions provided in Tables 2A-2B, wherein the compositions exhibit a cooling capacity (CAP) that is within about ±20% of the cooling capacity of R-134a or R-513A. In some embodiments, the composition is a composition selected from the group of compositions provided in Tables 2A-2B, wherein the compositions exhibit a cooling capacity (CAP) that is within about ±15% of the cooling capacity of R-134a or R-513A. In some embodiments, the composition is a composition selected from the group of compositions provided in Tables 2A-2B, wherein the compositions exhibit a cooling capacity (CAP) that is within about ±10% of the cooling capacity of the R-134a or R-513A. In some embodiments, the composition is a composition selected from the group of compositions provided in Tables 2A-2B, wherein the compositions exhibit a cooling capacity (CAP) that is within about ±5% of the cooling capacity of the R-134a or R-513A. In some embodiments, the composition is a composition selected from the group of compositions provided in Tables 2A-2B, wherein the compositions exhibit a GWP less than about 750. In some embodiments, the composition is a composition selected from the group of compositions provided in Tables 2A-2B, wherein the compositions exhibit a GWP less than about 400. In some embodiments, the composition is a composition selected from the group of compositions provided in Tables 2A-2B, wherein the compositions exhibit a GWP less than about 250. In some embodiments, the composition is a composition selected from the group of compositions provided in Tables 2A-2B, wherein the compositions exhibit a GWP less than about 150.

In some embodiments, the composition provided herein is selected from the group of compositions provided in Tables 3A-3B.

In some embodiments, the composition is a composition selected from the group of compositions provided in Tables 3A-3B, wherein the compositions exhibit a cooling capacity (CAP) that is within about ±3% to about ±20% of the cooling capacity of R-134a or R-513A.

In some embodiments, the composition is a composition selected from the group of compositions provided in Tables 3A-3B, wherein the compositions exhibit a cooling capacity (CAP) that is within about ±20% of the cooling capacity of R-134a or R-513A. In some embodiments, the composition is a composition selected from the group of compositions provided in Tables 3A-3B, wherein the compositions exhibit a cooling capacity (CAP) that is within about ±15% of the cooling capacity of R-134a or R-513A. In some embodiments, the composition is a composition selected from the group of compositions provided in Tables 3A-3B, wherein the compositions exhibit a cooling capacity (CAP) that is within about ±10% of the cooling capacity of the R-134a or R-513A. In some embodiments, the composition is a composition selected from the group of compositions provided in Tables 3A-3B, wherein the compositions exhibit a cooling capacity (CAP) that is within about ±5% of the cooling capacity of the R-134a or R-513A. In some embodiments, the composition is a composition selected from the group of compositions provided in Tables 3A-3B, wherein the compositions exhibit a GWP less than about 750. In some embodiments, the composition is a composition selected from the group of compositions provided in Tables 3A-3B, wherein the compositions exhibit a GWP less than about 400. In some embodiments, the composition is a composition selected from the group of compositions provided in Tables 3A-3B, wherein the compositions exhibit a GWP less than about 250. In some embodiments, the composition is a composition selected from the group of compositions provided in Tables 3A-3B, wherein the compositions exhibit a GWP less than about 150.

Methods of Use

The compositions provided herein can act as a working fluid used to carry heat from a heat source to a heat sink. Such heat transfer compositions may also be useful as a refrigerant in a cycle wherein the fluid undergoes a phase change; that is, from a liquid to a gas and back, or vice versa. Examples of heat transfer systems include but are not limited to air conditioners, freezers, refrigerators, heat pumps, water chillers, flooded evaporator chillers, direct expansion chillers, walk-in coolers, high temperature heat pumps, mobile refrigerators, mobile air conditioning units, immersion cooling systems, data-center cooling systems, and combinations thereof. Accordingly, the present application provides a heat transfer system (e.g., a heat transfer apparatus) as described herein, comprising a composition provided herein. In some embodiments, the composition provided herein is useful as a working fluid (e.g., a working fluid for refrigeration or heating applications) in the heat transfer apparatus. In some embodiments, the compositions provided herein are useful in an apparatus or system comprising a high temperature heat pump. In some embodiments, the high temperature heat pump comprises a centrifugal compressor. In some embodiments, the compositions provided herein are useful in an apparatus or system comprising a chiller apparatus. In some embodiments, the compositions provided herein are useful in an apparatus or system comprising a centrifugal chiller apparatus. In some embodiments, the compositions provided herein are useful in a centrifugal high temperature heat pump.

Mechanical vapor-compression refrigeration, air conditioning and heat pump systems include an evaporator, a compressor, a condenser, and an expansion device. A refrigeration cycle re-uses refrigerant in multiple steps producing a cooling effect in one step and a heating effect in a different step. The cycle can be described as follows: Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

A body to be cooled or heated may be defined as any space, location, object or body for which it is desirable to provide cooling or heating. Examples include spaces (open or enclosed) requiring air conditioning, cooling, or heating, such as a room, an apartment, or building, such as an apartment building, university dormitory, townhouse, or other attached house or single family home, hospitals, office buildings, supermarkets, college or university classrooms or administration buildings and automobile or truck passenger compartments. Additionally, a body to be cooled may include electronic devices, such as computer equipment, central processing units (cpu), data-centers, server banks, and personal computers among others.

By "in the vicinity of" is meant that the evaporator of the system containing the refrigerant is located either within or adjacent to the body to be cooled, such that air moving over the evaporator would move into or around the body to be cooled. In the process for producing heating, "in the vicinity of" means that the condenser of the system containing the refrigerant is located either within or adjacent to the body to be heated, such that the air moving over the evaporator would move into or around the body to be heated. In some embodiments, for heat transfer, "in the vicinity of" may mean that the body to be cooled is immersed directly in the heat transfer composition or tubes containing heat transfer compositions run into around internally, and out of electronic equipment, for instance.

Exemplary refrigeration systems include, but are not limited to, equipment including commercial, industrial or residential refrigerators and freezers, ice machines, self-contained coolers and freezers, vending machines, flooded evaporator chillers, direct expansion chillers, water chiller, centrifugal chillers, walk-in and reach-in coolers and freezers, and combination systems. In some embodiments, the compositions provided herein may be used in supermarket refrigeration systems. Additionally, stationary applications may utilize a secondary loop system that uses a primary refrigerant to produce cooling in one location that is transferred to a remote location via a secondary heat transfer fluid.

In some embodiments, the compositions provided herein are useful in mobile heat transfer systems, including refrigeration, air conditioning, or heat pump systems or apparatus. In some embodiments, the compositions are useful in stationary heat transfer systems, including refrigeration, air conditioning, or heat pump systems or apparatus.

As used herein, mobile refrigeration, air conditioning, or heat pump systems refers to any refrigeration, air conditioner, or heat pump apparatus incorporated into a transportation unit for the road, rail, sea or air. Mobile air conditioning or heat pumps systems may be used in automobiles, trucks, railcars or other transportation systems. Mobile refrigeration may include transport refrigeration in trucks, airplanes, or rail cars. In addition, apparatus which are meant to provide refrigeration for a system independent of any moving carrier, known as "intermodal" systems, are including in the present inventions. Such intermodal systems include "containers" (combined sea/land transport) as well as "swap bodies" (combined road and rail transport).

As used herein, stationary air conditioning or heat pump systems are systems that are fixed in place during operation. A stationary air conditioning or heat pump system may be associated within or attached to buildings of any variety. These stationary applications may be stationary air conditioning and heat pumps, including but not limited to chillers, heat pumps, including residential and high temperature heat pumps, residential, commercial or industrial air conditioning systems, and including window, ductless, ducted, packaged terminal, and those exterior but connected to the building such as rooftop systems.

Stationary heat transfer may refer to systems for cooling electronic devices, such as immersion cooling systems, submersion cooling systems, phase change cooling systems, data-center cooling systems or simply liquid cooling systems.

In some embodiments, a method is provided for using the present compositions as a heat transfer fluid. The method comprises transporting said composition from a heat source to a heat sink.

In some embodiments, a method is provided for producing cooling comprising evaporating any of the present compounds or compositions in the vicinity of a body to be cooled, and thereafter condensing said composition.

In some embodiments, a method is provided for producing heating comprising condensing any of the present compositions in the vicinity of a body to be heated, and thereafter evaporating said compositions.

In some embodiments, the composition is for use in heat transfer, wherein the working fluid is a heat transfer component.

In some embodiments, the compositions of the invention are for use in refrigeration or air conditioning.

In some embodiments, compositions of the present invention may be useful for reducing or eliminating the flammability of flammable refrigerants provided herein (e.g., R-134a or R-513A). In some embodiments, the present application provided herein is a method for reducing the flammability of a flammable refrigerant comprising adding a composition comprising a composition as disclosed herein to a flammable refrigerant.

The compositions provided herein may be useful as a replacement for a currently used ("incumbent") refrigerant. As used herein, the term "incumbent refrigerant" shall be understood to mean the refrigerant for which the heat transfer system was designed to operate, or the refrigerant that is resident in the heat transfer system. In some embodiments, the incumbent refrigerant is R-134a or R-513A. In some embodiments, the incumbent refrigerant is R-134a. In some embodiments, the incumbent refrigerant is R-513A. In some embodiments, the replacement refrigerant is a composition provided herein.

Often replacement refrigerants are most useful if capable of being used in the original refrigeration equipment designed for a different refrigerant, e.g., with minimal to no system modifications. In many applications, some embodiments of the disclosed compositions are useful as refrigerants and provide at least comparable cooling performance (meaning cooling capacity) as the refrigerant for which a replacement is being sought.

In some embodiments, the replacement refrigerant provided herein (i.e., a composition provided herein) exhibits a cooling capacity that is within about ±3% to about ±20% of the cooling capacity of the R-134a or R-513A. In some embodiments, the replacement refrigerant provided herein exhibits a cooling capacity that is within about ±20% of the cooling capacity of the R-134a or R-513A. In some embodiments, the replacement refrigerant provided herein exhibits a cooling capacity that is within about ±15% of the cooling capacity of the R-134a or R-513A. In some embodiments, the replacement refrigerant provided herein exhibits a cooling capacity that is within about ±10% of the cooling capacity of the R-134a or R-513A. In some embodiments, the replacement refrigerant provided herein exhibits a cooling capacity that is within about ±5% of the cooling capacity of the R-134a or R-513A. In some embodiments, the replacement refrigerant provided herein exhibits a cooling capacity that is within about ±3% of the cooling capacity of the R-134a or R-513A.

In some embodiments, the replacement refrigerant provided herein (i.e., a composition provided herein) exhibits a cooling capacity that is within about ±3% to about ±20% of the cooling capacity of the R-134a or R-513A and has a GWP less than about 750. In some embodiments, the replacement refrigerant provided herein exhibits a cooling capacity that is within about ±3% to about ±20% of the cooling capacity of the R-134a or R-513A and has a GWP less than about 400. In some embodiments, the replacement refrigerant provided herein exhibits a cooling capacity that is within about ±3% to about ±20% of the cooling capacity of the R-134a or R-513A and has a GWP less than about 250. In some embodiments, the replacement refrigerant provided herein exhibits a cooling capacity that is within about ±3% to about ±20% of the cooling capacity of the R-134a or R-513A and has a GWP less than about 150.

In some embodiments, the replacement refrigerant provided herein exhibits a cooling capacity that is within about ±5% of the cooling capacity of the R-134a or R-513A and has a GWP less than about 150.

In some embodiments, the method comprises replacing the R-134a or R-513A in a high temperature heat pump with a replacement refrigerant composition provided herein. In some embodiments, the high temperature heat pump is a centrifugal high temperature heat pump.

In some embodiments, the high temperature heat pump comprises a condenser operating at a temperature greater than about 50° C. In some embodiments, the high temperature heat pump comprises a condenser operating at a temperature greater than about 100° C. In some embodiments, the high temperature heat pump comprises a condenser operating at a temperature greater than about 120° C. In some embodiments, the high temperature heat pump comprises a condenser operating at a temperature greater than about 150° C.

In some embodiments, the replacement refrigerant exhibits a coefficient of performance for heating (COP) that is within about ±5% of the COP of the R-134a or R-513A. In some embodiments, the replacement refrigerant exhibits a COP that is within about ±3% of the COP of the R-134a or R-513A. In some embodiments, the replacement refrigerant exhibits a COP that is about equal to the COP of the R-134a or R-513A.

In some embodiments, the present application provides a method for improving energy efficiency of a heat transfer system or apparatus comprising an incumbent refrigerant, comprising substantially replacing the incumbent refrigerant with a replacement refrigerant composition provided herein, thereby improving the efficiency of the heat transfer system. In some embodiments, the heat transfer system is a chiller system or chiller apparatus provided herein.

In some embodiments is provided a method for operating a heat transfer system or for transferring heat that is designed to operate with an incumbent refrigerant by charging an empty system with a composition of the present invention, or by substantially replacing said incumbent refrigerant with a composition of the present invention.

As used herein, the term "substantially replacing" shall be understood to mean allowing the incumbent refrigerant to drain from the system, or pumping the incumbent refrigerant from the system, and then charging the system with a composition of the present invention. The system may be flushed with one or more quantities of the replacement refrigerant before being charged. It shall be understood that in some embodiments, some small quantity of the incumbent refrigerant may be present in the system after the system has been charged with the composition of the present invention.

In another embodiment is provided a method for recharging a heat transfer system that contains an incumbent refrigerant and a lubricant, said method comprising substantially removing the incumbent refrigerant from the heat transfer system while retaining a substantial portion of the lubricant in said system and introducing one of the present compositions to the heat transfer system. In some embodiments, the lubricant in the system is partially replaced.

In some embodiments, the compositions of the present invention may be used to top-off a refrigerant charge in a chiller. For example, if a chiller using R-134a or R-513A has diminished performance due to leakage of refrigerant, the compositions as disclosed herein may be added to bring performance back up to specification.

In some embodiments, a heat exchange system containing any the presently disclosed compositions is provided, wherein said system is selected from the group consisting of air conditioners, freezers, refrigerators, heat pumps, water chillers, flooded evaporator chillers, direct expansion chillers, walk-in coolers, heat pumps, mobile refrigerators, mobile air conditioning units, and systems having combinations thereof. Additionally, the compositions provided herein may be useful in secondary loop systems wherein these compositions serve as the primary refrigerant thus providing cooling to a secondary heat transfer fluid that thereby cools a remote location.

The compositions of the present invention may have some temperature glide in the heat exchangers. Thus, the systems may operate more efficiently if the heat exchangers are operated in counter-current mode or cross-current mode with counter-current tendency. Counter-current tendency means that the closer the heat exchanger can get to counter-current mode the more efficient the heat transfer. Thus, air conditioning heat exchangers, in particular evaporators, are designed to provide some aspect of counter-current tendency.

Therefore, provided herein is an air conditioning or heat pump system wherein said system includes one or more heat exchangers (either evaporators, condensers or both) that operate in counter-current mode or cross-current mode with counter-current tendency.

In some embodiments, provided herein is a refrigeration system wherein said system includes one or more heat exchangers (either evaporators, condensers or both) that operate in counter-current mode or cross-current mode with counter-current tendency.

In some embodiments, the refrigeration, air conditioning or heat pump system is a stationary refrigeration, air conditioning or heat pump system. In some embodiments the refrigeration, air conditioning, or heat pump system is a mobile refrigeration, air conditioning or heat pump system.

Additionally, in some embodiments, the disclosed compositions may function as primary refrigerants in secondary loop systems that provide cooling to remote locations by use of a secondary heat transfer fluid, which may comprise water, an aqueous salt solution (e.g., calcium chloride), a glycol, carbon dioxide, or a fluorinated hydrocarbon fluid (meaning an HFC, HCFC, hydrofluoroolefin ("HFO"), hydrochlorofluoroolefin ("HCFO"), chlorofluoroolefin ("CFO"), or perfluorocarbon ("PFC"). In this case, the secondary heat transfer fluid is the body to be cooled as it is adjacent to the evaporator and is cooled before moving to a second remote body to be cooled. In other embodiments, the disclosed compositions may function as the secondary heat transfer fluid, thus transferring or providing cooling (or heating) to the remote location.

In some embodiments, the compositions provided herein further comprise one or more non-refrigerant components (also referred to herein as additives) selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, polymerization inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive (s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In one embodiment, the lubricant is selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso® 1GS, Suniso® 3GS and Suniso® SGS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Michigan), and mixtures thereof, meaning mixtures of any of the lubricants disclosed in this paragraph.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant when in the compressor may pick up an amount of the equipment lubricant to change the refrigerant-lubricant composition from the starting ratio.

The non-refrigerant component used with the compositions of the present invention may include at least one dye. The dye may be at least one ultra-violet (UV) dye. As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

In some embodiments, the UV dye may be a fluorescent dye. In some embodiments, the fluorescent dye is selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 3 to 15 carbon atoms. The compatibilizer may be at least one hydrocarbon, which may be selected from the group consisting of at least propanes, including propylene and propane, butanes, including n-butane and isobutene, pentanes, including n-pentane, isopentane, neopentane and cyclopentane, hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic) (Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2$=$C(R^1)CO_2R^2$, $CH_2$=$C(R^3)C_6H_4R^4$, and $CH_2$=$C(R^5)C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, DE, 19898, USA) under the trademark Zonyl® PHS. Zonyl® PHS is a random copolymer made by polymerizing 40 weight percent $CH_2$=$C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate ($CH_2$=$C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component which may be used with the compositions of the present invention may be a metal surface deactivator. The metal surface deactivator is selected from the group consisting of areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, hydrazones, such as acetaldehyde dimethylhydrazone, ionic liquids, and mixtures thereof, meaning mixtures of any of the stabilizers disclosed in this paragraph. Terpene or terpenoid stabilizers may include farnesene. Phosphite stabilizers may include diphenyl phosphite.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad® 620; isopropylated triphenyl phosphates such as those commercially available under the trademarks Durad® 220 and Durad® 110; anisole; 1,4-dimethoxybenzene; 1,4-diethoxybenzene; 1,3,5-trimethoxybenzene; myrcene, alloocimene, limonene (in particular, d-limonene); retinal; pinene (α or β); menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, and $F^-$, and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol, 2,2- or 4,4-biphenyl-diols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide and mixtures thereof, meaning mixtures of any of the phenols disclosed in this paragraph.

The non-refrigerant component which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, perfluorocarbons, fluoroethers, brominated compounds, iodinated compounds, alcohols, aldehydes and ketones, nitrous oxide and combinations thereof. Alternatively, the tracer may be selected from the group consisting of trifluoromethane (HFC-23), fluoroethane (HFC-161), 1,1,1,2,2,3,3-heptafluoropropane (HFC-227ca), 1,1,1,2,2,3-hexafluoropropane (HFC-236cb), 1,1,1,2,3,3-hexafluoropropane (HFC-236ea), 1,1,1,2,2-pentafluoropropane (HFC-245cb), 1,1,2,2-tetrafluoropropane (HFC-254cb), 1,1,1,2-tetrafluoropropane (HFC-254eb), 1,1,1-trifluoropropane (HFC-263fb), 2,2-difluoropropane (HFC-272ca), 2-fluoropropane (HFC-281 ea), 1-fluoropropane (HFC-281fa), 1,1,1,2,2,3,3,4-nonafluorobutane (HFC-329p), 1,1,1-trifluoro-2-methylpropane (HFC-329mmz), 1,1,1,2,2,4,4,4-octafluorobutane (HFC-338mf), 1,1,2,2,3,3,4,4-octafluorobutane (HFC-338pcc), 1,1,1,2,2,3,3-heptafluorobutane (HFC-347s), hexafluoroethane (perfluoroethane, PFC-116), perfluoro-cyclopropane (PFC-C216), perfluoropropane (PFC-218), perfluoro-cyclobutane (PFC-C318), perfluorobutane (PFC-31-10mc), perfluoro-2-methylpropane ($CF_3CF(CF_3)_2$), perfluoro-1,3-dimethylcyclobutane (PFC-C51-12mycm), trans-perfluoro-2,3-dimethylcyclobutane (PFC-C51-12mym, trans), cis-perfluoro-2,3-dimethylcyclobutane (PFC-C51-12mym, cis), perfluoromethylcyclopentane, perfluoromethylcyclohexane, perfluorodimethylcyclohexane (ortho, meta, or para), perfluoroethylcyclohexane, perfluoroindan, perfluorotrimethylcyclohexane and isomers thereof, perfluoroisopropylcyclohexane, cis-perfluorodecalin, trans-perfluorodecalin, cis- or trans-perfluoromethyldecalinand mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether as described in detail in US 2007-0284555, the disclosure of which is incorporated herein by reference in its entirety.

It will be recognized that certain of the additives referenced above as suitable for the non-refrigerant component have been identified as potential refrigerants. However, in accordance with this invention, when these additives are used, they are not present at an amount that would affect the novel and basic characteristics of the refrigerant mixtures of this invention.

In some embodiments, the refrigerant compositions disclosed herein may be prepared by any convenient method to combine the desired amounts of the individual components as is standard in the art. A preferred method is to weigh the desired component amounts and thereafter combine the components in an appropriate vessel. Agitation may be used, if desired.

EXAMPLES

The invention will be described in greater detail by way of specific examples. The following examples are offered for illustrative purposes, and are not intended to limit the invention in any manner. Those of skill in the art will readily recognize a variety of non-critical parameters which can be changed or modified to yield essentially the same results. The following parameters were used as a basis for calculating the comparative data for R-134a and R-513A, as shown in Table A: $T_{condenser}$=40.0° C.; $T_{evaporator}$=4.0° C.; Compressor Clearance: 0.05; Compressor Displacement 0.1 m³/min; Cooling Load: 1.0 tonnes; Efficiency: 75%; $T_{return}$=18° C.; Subcool: 8 K.

TABLE A

| 134a (wt %) | R-513A (wt %) | AR4 GWP | Evap P (kPa) | Cond P (kPa) | Disch T (° C.) | Avg Glide (K) | COP | Cap (kJ/m³) |
|---|---|---|---|---|---|---|---|---|
| 100 | 0 | 1430 | 338 | 1017 | 65 | 0 | 5.141 | 2611 |
| 0 | 100 | 631 | 372 | 1072 | 60 | 0 | 5.096 | 2700 |

Example 1: R-1225ye(E)/R-32 Blends as Replacement Refrigerants for R-134a or R-513A The cooling performance for mixtures containing R-1225ye(E), R-1234yf, R-32 and optionally R-125 was determined, including: suction pressure (Suction P), discharge pressure (Disch P), compressor discharge temperature (Disch T), and Average Temperature Glide for the evaporator and condenser (Average glide). Relative energy efficiency (COP) and volumetric cooling capacity (CAP) for mixtures of the present invention relative to R-134a were also determined. R-513A is a mixture of 44 weight percent R-134a and 56 wt % R-1234yf. The following parameters were used to calculate the data shown in Tables 1A-1B: $T_{condenser}$=40.0° C.; $T_{evaporator}$=4.0° C.; Compressor Clearance: 0.05; Compressor Displacement 0.1 m³/min; Cooling Load: 1.0 tonnes; Efficiency: 75%; $T_{return}$=18° C.; Subcool: 8 K.

TABLE 1A

| R-1225yeE (wt %) | R-1234yf (wt %) | R-32 (wt %) | R-125 (wt %) | AR4 GWP | Evap P (kPa) | Cond P (kPa) | Disch T (° C.) | Avg Glide (K) |
|---|---|---|---|---|---|---|---|---|
| 90 | 0 | 10 | 0 | 71 | 322 | 979 | 64 | 9.0 |
| 49 | 48 | 2 | 1 | 52 | 311 | 911 | 58 | 3.4 |
| 47 | 47 | 4 | 2 | 101 | 335 | 983 | 60 | 5.3 |
| 46 | 45 | 6 | 3 | 149 | 357 | 1048 | 61 | 6.8 |
| 44 | 44 | 8 | 4 | 198 | 381 | 1114 | 62 | 7.9 |
| 43 | 42 | 10 | 5 | 246 | 403 | 1174 | 63 | 8.7 |
| 41 | 41 | 12 | 6 | 294 | 426 | 1235 | 63 | 9.3 |

TABLE 1B

| 1225yeE (wt %) | 1234yf (wt %) | R-32 (wt %) | R-125 (wt %) | AR4 GWP | COP | COP rel to 134a | Cap (kJ/m³) | Cap rel to 134a |
|---|---|---|---|---|---|---|---|---|
| 90 | 0 | 10 | 0 | 71 | 5.167 | 101% | 2503 | 96% |
| 49 | 48 | 2 | 1 | 52 | 5.132 | 100% | 2302 | 88% |
| 47 | 47 | 4 | 2 | 101 | 5.119 | 100% | 2478 | 95% |
| 46 | 45 | 6 | 3 | 149 | 5.114 | 99% | 2642 | 101% |
| 44 | 44 | 8 | 4 | 198 | 5.110 | 99% | 2808 | 108% |
| 43 | 42 | 10 | 5 | 246 | 5.105 | 99% | 2959 | 113% |
| 41 | 41 | 12 | 6 | 294 | 5.096 | 99% | 3112 | 119% |

The results in Tables 1A-1B show that the mixtures analyzed in this example are good alternatives to R-134a and R-513A with similar cooling capacities and energy efficiencies (COP). They also exhibit similar compressor discharge temperatures to R-134a and R-513A.

Example 2: R-1225ye(E)/R-32/R-1234yf/$CO_2$ Blends as Replacement Refrigerants for R-134a or R-513A Cooling performance was evaluated using the procedure of Example 1. The following parameters were used to calculate the data shown in Tables 1A-1B: $T_{condenser}$=40.0° C.; $T_{evaporator}$=4.0° C.; Compressor Clearance: 0.05; Compressor Displacement 0.1 m³/min; Cooling Load: 1.0 tonnes; Efficiency: 75%; $T_{return}$=18° C.; Subcool: 8 K.

TABLE 2A

| 1225yeE (wt %) | 1234yf (wt %) | R32 (wt %) | $CO_2$ (wt %) | AR4 GWP | Evap P (kPa) | Cond P (kPa) | Disch T (° C.) | Avg Glide (K) |
|---|---|---|---|---|---|---|---|---|
| 49 | 48 | 2 | 1 | 17 | 327 | 981 | 60 | 6.3 |
| 47 | 47 | 4 | 2 | 31 | 369 | 1117 | 62 | 10.3 |
| 46 | 45 | 6 | 3 | 44 | 411 | 1243 | 64 | 13.4 |

TABLE 2B

| 1225yeE (wt %) | 1234yf (wt %) | R32 (wt %) | $CO_2$ (wt %) | AR4 GWP | COP | COP rel to 134a | Cap (kJ/m³) | Cap rel to 134a |
|---|---|---|---|---|---|---|---|---|
| 49 | 48 | 2 | 1 | 17 | 5.075 | 99% | 2447 | 94% |
| 47 | 47 | 4 | 2 | 31 | 5.050 | 98% | 2772 | 106% |
| 46 | 45 | 6 | 3 | 44 | 5.044 | 98% | 3084 | 118% |

The results in Tables 2A-2B show that the mixtures analyzed in this example are good alternatives to R-134a and R-513A with similar cooling capacities and energy efficiencies (COP). They also exhibit similar compressor discharge temperatures to R-134a and R-513A.

Example 3:
R-1225ye(E)/R-32/R-1234yf/R-125/$CO_2$ Blends as
Replacement Refrigerants for R-134a or R-513A Cooling performance was evaluated using the procedure of Example 1. The following parameters were used to calculate the data shown in Tables 1A-1B: $T_{condenser}$=40.0° C.; $T_{evaporator}$=4.0° C.; Compressor Clearance: 0.05; Compressor Displacement 0.1 m³/min; Cooling Load: 1.0 tonnes; Efficiency: 75%; $T_{return}$=18° C.; Subcool: 8 K.

TABLE 3A

| 1225yeE (wt %) | 1234yf (wt %) | R-32 (wt %) | R-125 (wt %) | $CO_2$ (wt %) | AR4 GWP | Evap P (kPa) | Cond P (kPa) | Disch T (° C.) | Avg Glide (K) |
|---|---|---|---|---|---|---|---|---|---|
| 47 | 47 | 4 | 1 | 1 | 66 | 351 | 1050 | 61 | 7.9 |
| 46 | 45 | 6 | 2 | 1 | 114 | 374 | 1113 | 62 | 9.1 |
| 44 | 44 | 8 | 3 | 1 | 163 | 398 | 1177 | 63 | 9.9 |
| 43 | 42 | 10 | 4 | 1 | 211 | 421 | 1235 | 64 | 10.6 |
| 46 | 45 | 6 | 1 | 2 | 79 | 392 | 1178 | 63 | 11.3 |
| 44 | 44 | 8 | 2 | 2 | 128 | 417 | 1240 | 64 | 11.9 |

TABLE 3B

| 1225yeE (wt %) | 1234yf (wt %) | R-32 (wt %) | R-125 (wt %) | $CO_2$ (wt %) | AR4 GWP | COP | COP rel to 134a | Cap (kJ/m³) | Cap rel to 134a |
|---|---|---|---|---|---|---|---|---|---|
| 47 | 47 | 4 | 1 | 1 | 66 | 5.078 | 99% | 2623 | 100% |
| 46 | 45 | 6 | 2 | 1 | 114 | 5.082 | 99% | 2785 | 107% |
| 44 | 44 | 8 | 3 | 1 | 163 | 5.083 | 99% | 2949 | 113% |
| 43 | 42 | 10 | 4 | 1 | 211 | 5.081 | 99% | 3098 | 119% |
| 46 | 45 | 6 | 1 | 2 | 79 | 5.059 | 98% | 2933 | 112% |
| 44 | 44 | 8 | 2 | 2 | 128 | 5.063 | 98% | 3094 | 118% |

The results in Tables 3A-3B show that the mixtures analyzed in this example are good alternatives to R-134a and R-513A with similar cooling capacities and energy efficiencies (COP). They also exhibit similar compressor discharge temperatures to R-134a and R-513A.

OTHER EMBODIMENTS

1. In some embodiments, the present application provides a composition comprising (E)-1,2,3,3,3-pentafluoro-1-propene and R-32.
2. The composition of embodiment 1, wherein the composition comprises about 85 to about 95 weight percent (E)-1,2,3,3,3-pentafluoro-1-propene and about 15 to about 5 weight percent R-32.
3. The composition of embodiment 1 or 2, wherein the composition comprises about 90 weight percent (E)-1,2,3,3,3-pentafluoro-1-propene and about 10 weight percent R-32.
4. The composition of any one of embodiments 1 to 3, further comprising a compound selected from HFO-1234yf, R-125, and $CO_2$, or any mixture thereof.
5. The composition of embodiment 1 or 4, wherein the composition comprises about 40 to about 95 weight percent (E)-1,2,3,3,3-pentafluoro-1-propene.
6. The composition of any one of embodiments 1, 4, and 5, wherein the composition comprises about 2 to about 12 weight percent R-32.
7. The composition of any one of embodiments 4 to 6, wherein the composition comprises about 41 to about 48 weight percent HFO-1234yf.
8. The composition of any one of embodiments 4 to 7, wherein the composition comprises about 1 to about 6 weight percent R-125.
9. The composition of any one of embodiments 4 to 8, wherein the composition comprises about 1 to about 3 weight percent CO2.
10. The composition of embodiment 4, wherein the composition comprises (E)-1,2,3,3,3-pentafluoro-1-propene, R-32, HFO-1234yf, and R-125.
11. The composition of embodiment 4 or 10, wherein the composition comprises about 41 to about 49 weight percent (E)-1,2,3,3,3-pentafluoro-1-propene, about 2 to about 12 weight percent R-32, about 41 to about 48 weight percent HFO-1234yf, and about 1 to about 6 weight percent R-125.
12. The composition of embodiment 4 or 10, wherein the composition comprises about 44 to about 47 weight percent (E)-1,2,3,3,3-pentafluoro-1-propene, about 4 to about 8 weight percent R-32, about 44 to about 47 weight percent HFO-1234yf, and about 2 to about 4 weight percent R-125.
13. The composition of any one of embodiments 4 and 10 to 12, wherein the composition has a GWP less than about 150.
14. The composition of any one of embodiments 4 and 10 to 13, wherein the composition comprises about 46 to about 47 weight percent (E)-1,2,3,3,3-pentafluoro-1-propene, about 4 to about 6 weight percent R-32, about 45 to about 47 weight percent HFO-1234yf, and about 2 to about 3 weight percent R-125.
15. The composition of embodiment 4, wherein the composition comprises (E)-1,2,3,3,3-pentafluoro-1-propene, R-32, HFO-1234yf, and CO2.
16. The composition of embodiment 4 or 15, wherein the composition comprises about 46 to about 49 weight percent (E)-1,2,3,3,3-pentafluoro-1-propene, about 2 to about 6 weight percent R-32, about 45 to about 48 weight percent HFO-1234yf, and about 1 to about 3 weight percent CO2.
17. The composition of any one of embodiments 4, 15 and 16, wherein the composition has a GWP less than about 150.
18. The composition of any one of embodiments 4 and 15 to 17, wherein the composition comprises about 47 to about 49 weight percent (E)-1,2,3,3,3-pentafluoro-1-propene, about 2 to about 4 weight percent R-32, about 47 to about 48 weight percent HFO-1234yf, and about 1 to about 2 weight percent CO2.

19. The composition of embodiment 4, wherein the composition comprises (E)-1,2,3,3,3-pentafluoro-1-propene, R-32, HFO-1234yf, R-125, and CO2.

20. The composition of embodiment 4 or 19, wherein the composition comprises about 43 to about 47 weight percent (E)-1,2,3,3,3-pentafluoro-1-propene, about 4 to about 10 weight percent R-32, about 42 to about 47 weight percent HFO-1234yf, about 1 to about 4 weight percent R-125, and about 1 to about 2 weight percent CO2.

21. The composition of any one of embodiments 4, 19, and 20, wherein the composition has a GWP less than about 150.

22. The composition of any one of embodiments 4 and 19 to 21, wherein the composition comprises about 44 to about 47 weight percent (E)-1,2,3,3,3-pentafluoro-1-propene, about 4 to about 8 weight percent R-32, about 44 to about 47 weight percent HFO-1234yf, about 1 to about 2 weight percent R-125, and about 1 to about 2 weight percent CO2.

23. The composition of any one of embodiments 4 and 19 to 21, wherein the composition comprises about 46 to about 47 weight percent (E)-1,2,3,3,3-pentafluoro-1-propene, about 4 to about 6 weight percent R-32, about 45 to about 47 weight percent HFO-1234yf, about 1 to about 2 weight percent R-125, and about 1 to about 1 weight percent CO2.

24. The composition of any one of embodiments 1 to 23, wherein the composition is selected from the group of compositions provided in Tables 1A-1B.

25. The composition of any one of embodiments 1 to 23, wherein the composition is selected from the group of compositions provided in Tables 2A-2B.

26. The composition of any one of embodiments 1 to 23, wherein the composition is selected from the group of compositions provided in Tables 3A-3B.

27. The composition of any one of embodiments 1 to 26, wherein the composition exhibits a GWP of less than about 150.

28. The composition of any one of embodiments 1 to 27, wherein the composition exhibits a cooling capacity (CAP) that is within about ±5% of the cooling capacity of the R-134a or R-513A.

29. A process for producing cooling, comprising condensing the composition of any one of embodiments 1 to 28, and thereafter evaporating said composition in the vicinity of a body to be cooled.

30. A process for producing heating, comprising evaporating the composition of any one of embodiments 1 to 28, and thereafter condensing said composition in the vicinity of a body to be heated.

31. A method of replacing R-134a or R-513A in a refrigeration, air conditioning, or heat pump system, comprising providing the composition of any one of embodiments 1 to 28, as replacement for said R-134a or R-513A.

32. The method of embodiment 31, which is a method of replacing R-134a in a refrigeration, air conditioning, or heat pump system.

33. The method of embodiment 31, which is a method of replacing R-513A in a refrigeration, air conditioning, or heat pump system.

34. An air conditioning system, heat pump system, or refrigeration system comprising the composition of any one of embodiments 1 to 28.

35. The air conditioning system, heat pump system, or refrigeration system of embodiment 34, wherein the system comprises an evaporator, compressor, condenser, and expansion device.

36. The air conditioning system, heat pump system, or refrigeration system of embodiment 34 or 35, wherein said system comprises one or more heat exchangers that operate in counter-current mode or cross-current mode with counter-current tendency.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A composition comprising about 41 to about 46 weight percent E-1,2,3,3,3-pentafluoro-1-propene (R-1225ye), about 6 to about 12 weight percent R-32, about 41 to about 45 weight percent HFO-1234yf, and about 3 to about 6 weight percent R-125.

2. A composition comprising about 46 to about 49 weight percent (E)-1,2,3,3,3-pentafluoro-1-propene, about 2 to about 6 weight percent R-32, about 45 to about 48 weight percent HFO-1234yf, and about 1 to about 2 weight percent $CO_2$.

3. A process for producing cooling, comprising condensing the composition of any of claims 1 or 2 and thereafter evaporating said composition in the vicinity of a body to be cooled.

4. A process for producing heating, comprising evaporating the composition of any of claims 1 or 2 and thereafter condensing said composition in the vicinity of a body to be heated.

5. A method of replacing R-134a or R-513A in a refrigeration, air conditioning, or heat pump system, comprising providing the composition of any of claims 1 or 2 as replacement for said R-134a or R-513A.

6. An air conditioning system, heat pump system, or refrigeration system comprising the composition of any of claims 1 or 2.

7. A composition comprising (E)-1,2,3,3,3-pentafluoro-1-propene (R-1225ye), R-32, about 1 to about 3 weight percent $CO_2$ and a compound selected from HFO-1234yf and R-125.

8. A composition comprising about 43 to about 47 weight percent (E)-1,2,3,3,3-pentafluoro-1-propene, about 4 to about 10 weight percent R-32, about 42 to about 47 weight percent HFO-1234yf, about 1 to about 4 weight percent R-125, and about 1 to about 2 weight percent $CO_2$.

9. A method of replacing R-134a or R-513A in a refrigeration, air conditioning, or heat pump system, comprising providing a refrigerant blend of (E)-1,2,3,3,3-pentafluoro-1-propene, R-32, and two additional compound selected from HFO-1234yf, R-125 and $CO_2$ to provide a blend having a CAP > than a CAP of one of R-134a or R-513A and replacing said R-134a or R-513A with said blend.

\* \* \* \* \*